June 30, 1959   A. J. DEVAUD   2,892,526
APPARATUS FOR CONTROL OF MACHINE OPERATIONS
Filed Jan. 14, 1954   3 Sheets-Sheet 1

INVENTOR
ALBERT J. DEVAUD
ATTORNEY

June 30, 1959 A. J. DEVAUD 2,892,526
APPARATUS FOR CONTROL OF MACHINE OPERATIONS
Filed Jan. 14, 1954 3 Sheets-Sheet 2

INVENTOR
ALBERT J. DEVAUD
BY Elmer J. Gorn
ATTORNEY

United States Patent Office 2,892,526
Patented June 30, 1959

2,892,526

APPARATUS FOR CONTROL OF MACHINE OPERATIONS

Albert J. Devaud, Waltham, Mass., assignor to Raytheon Manufacturing Company, Waltham, Mass., a corporation of Delaware Application January 14, 1954, Serial No. 404,117

12 Claims. (Cl. 192—142)

This invention relates to machine tools, and particularly to establishment of precise control of the position and motion of a machine element during an operating cycle.

The invention provides a method and means for achieving extreme accuracy in the starting and stopping of the feeding operation of a power-driven work holder carrying a piece to be machined, or a power-driven tool holder feeding a tool along a piece to be machined.

Two of the steps employed involve, first, the counting of electrical current oscillations, or pulses, occurring at a frequency that is governed by the motion of the piece being machined, and, secondly, the stopping of the work holder drive when the number of generated pulses reaches a total corresponding to a prescribed distance dimension; the prescribed dimension (linear or angular) being so chosen as to conform to the machining requirements for the particular piece being worked upon.

The pulse frequency may be determined by the interaction of fixed and movable capacitance elements, and the drive cessation may be accomplished by energization of a brake or restraint-applying mechanism under the control of an electronic circuit responsive to the completion of the prescribed pulse count. The described process and mechanism may be applied to a work-feed type of machine tool—this being the application assumed in the following description of the invention—or they may be applied to a tool-feed type of machine tool. In either case, there is pulse transmission at a frequency determined by the rate of motion of a moving feed element of the machine, and there is also a feed stopping operation under the control of the pulse count.

In the preferred embodiment of the invention the moving capacitance assembly is in vernier relationship to the fixed capacitance assembly, and such a relationship facilitates relatively close spacing of successive pulses to be counted, hence extremely high accuracy in selection of the drive stopping point. On the other hand, the principles of the invention embrace all equivalent arrangements of capacitance units, whether in the vernier or non-vernier category, and whether the assembly be one of simple capacitance effects or of compound effects in which the capacitance factors are supplemented with resistance and/or inductance factors, as explained more fully hereinafter.

Other characteristics and potentialities of the invention will become apparent upon reference to the following description and the accompanying drawings wherein.

Figure 1:
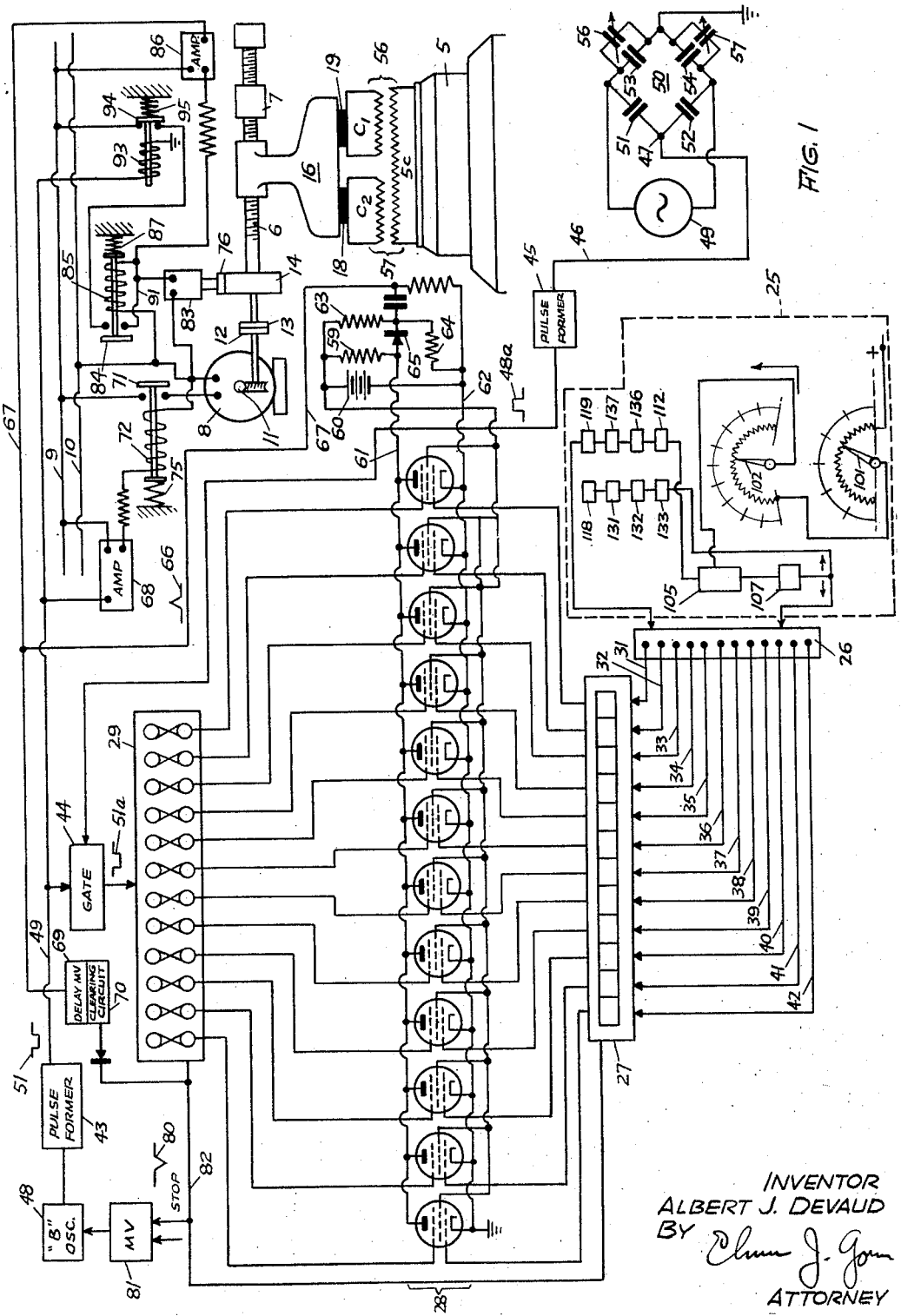
Fig. 1 is a schematic representation of the invention as applied to a motor-driven machine element.

Referring first to Fig. 1, reference numeral 5 designates the stationary base, or bed, of a machine of the universal type including a power-driven lead screw 6 carrying a work holder 7 having threads inter-engaged with the threads of screw 6 so that rotation of the lead screw causes the work holder 7 (and the work-piece, not shown, carried thereon) to move linearly through a prescribed course whose extent will be proportional to the number of revolutions of the driving screw 6. The screw 6 is rotated by an electric motor 8 adapted to draw current from a source 9, 10; the motor drive including a speed reduction worm 11, slip clutch elements 12 and 13, a brake drum 14, and the lead screw 6.

Figure 3:
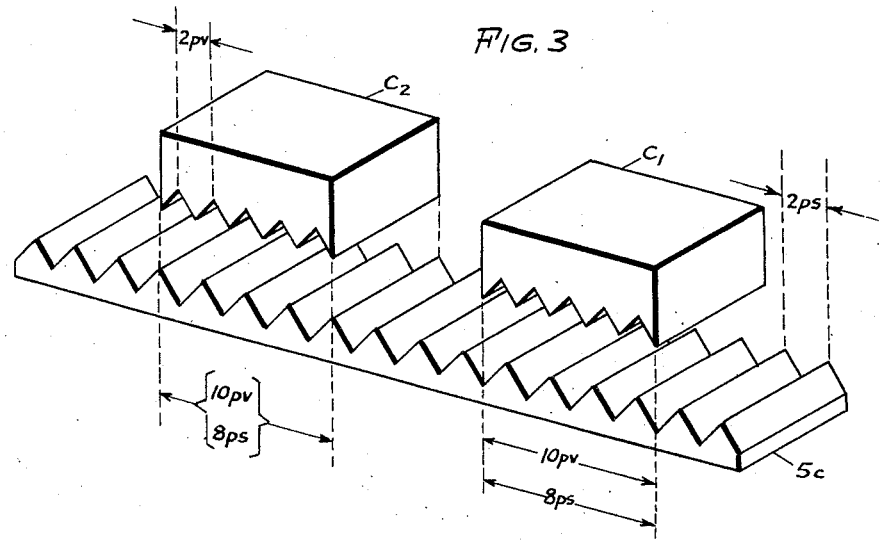

In addition to driving the linearly traveling work holder 7, the screw 6 also drives a linearly traveling control carriage 16 having projecting arms supporting a pair of electrically conductive plates $C_1$ and $C_2$ insulated therefrom, as indicated at 18 and 19, and having their bottom surfaces corrugated to form capacitance ridges whose spacing differs slightly from the spacing of the corrugations of the upper surface of a third electrically conductive plate 5c secured to machine base 5; the difference in spacing, as illustrated best in Fig. 3, being such that the aggregate width of twenty ridges on either plate $C_1$ or plate $C_2$ equals the aggregate width of nineteen ridges on plate 5c, thus establishing a vernier relationship between the upper and lower plates which operates to produce twenty peak capacitance values at twenty equally spaced sub-intervals comprising the complete interval consumed in moving from one ridge to the next—that is, the ridge "pitch" distance, as indicated at $2ps$ in Fig. 3. If this pitch distance is $\frac{1}{50}$ inch, there will be a total of 1,000 capacitance cycles (20×50) for each inch of travel of the carriage 16. By shifting plate $C_1$ a half pitch out of phase, as compared with plate $C_2$ (which phase shift is actually shown in Fig. 3), it is possible to double the frequency of production of the capacitance peaks, or to maintain the same frequency with $\frac{1}{25}$ inch pitch distance in lieu of the $\frac{1}{50}$ inch spacing above suggested.

Various circuit arrangements may be resorted to for converting the successive capacitance peaks, above described, into energy pulsations of sufficient distinctness to actuate a counting mechanism, whereby the travel of carriage 16 may be measured in terms of an electronic digital count which will bear an accurate and uniform relationship to the distance traversed by the carriage. One such circuit arrangement, as shown in Fig. 1, involves an A.C. source 49 and a Wheatstone bridge 50 having fixed capacitance units 51, 52, 53, and 54 of equal value in its four branches, with variable capacitance units 56 and 57 in parallel with the units 53 and 54, respectively. Units 56 and 57 are composed of the corrugated conducting plates $C_1$ and $C_2$ heretofore referred to, plus the stationary plate 5c, and common to both.

In the following equations, symbol C denotes the arithmetical mean between maximum and minimum values of condensers 56 and 57, and symbol c the variation from this average. Symbol C also denotes the fixed value of condensers 51, 52, 53, and 54; $x$ denotes the cyclic time factor; $ps$ is the described half-pitch phase difference between $C_1$ and $C_2$; $\gamma$ the ratio $c/C$; $e$ the output voltage amplitude; and E the input A.C. voltage of any available frequency. The value $e$ may be expressed as follows:

$$(1) \quad e = (\pm) E \left[ \frac{\frac{1}{C+c(x)}}{\frac{1}{C+c(x)} + \frac{1}{C+c(x+ps)}} - \left( \frac{\frac{1}{C}}{\frac{1}{C}+\frac{1}{C}} \right) \right]$$

as representative of the standard law of operation of a Wheatstone bridge of the character under discussion.

Equation 1 simplifies through the following steps:

$$(2) \quad \frac{e}{E} = (\pm) \frac{\frac{1}{C+c(x)}}{\frac{1}{C+c(x)} + \frac{1}{C+c(x+ps)}} - \frac{1}{2}$$

$$(3) \quad \frac{e}{E} = (\pm) \frac{\frac{2}{C+c(x)} - \frac{1}{C+c(x)} - \frac{1}{C+c(x+ps)}}{2\left[\frac{1}{C+c(x)} + \frac{1}{C+c(x+ps)}\right]}$$

$$(4) \quad \frac{e}{E} = (\pm) \frac{\frac{1}{C+c(x)} - \frac{1}{C+c(x+ps)}}{2\left[\frac{C+c(x+ps)+C+c(x)}{[C+c(x)][C+c(x+ps)]}\right]}$$

$$(5) \quad \frac{e}{E} = (\pm) \frac{C+c(x+ps)-C-c(x)}{2[2C+c(x+ps)+c(x)]}$$

$$(6) \quad \frac{e}{E} = (\pm) \frac{c(x+ps)-c(x)}{4C\left[1+\frac{c(x)+c(x+ps)}{2C}\right]}$$

Substituting for $$\frac{c}{C}$$

the symbol $\gamma$, Equation 6 becomes:

$$(7) \quad \frac{e}{E} = (\pm) \frac{\gamma(x+ps)-\gamma(x)}{4\left[1+\frac{\gamma(x)+\gamma(x+ps)}{2}\right]}$$

For the reason noted below, the quantity $$\frac{\gamma x + \gamma(x+ps)}{2}$$

in the denominator may be neglected, so that Equation 7 may be considered, for practical purposes, as taking the form:

$$(8) \quad \frac{e}{E} = \frac{1}{4}[\gamma(x+ps)-\gamma(x)] \text{ or } \frac{1}{4}[\gamma(x)-\gamma(x+ps)]$$

Figure 4:
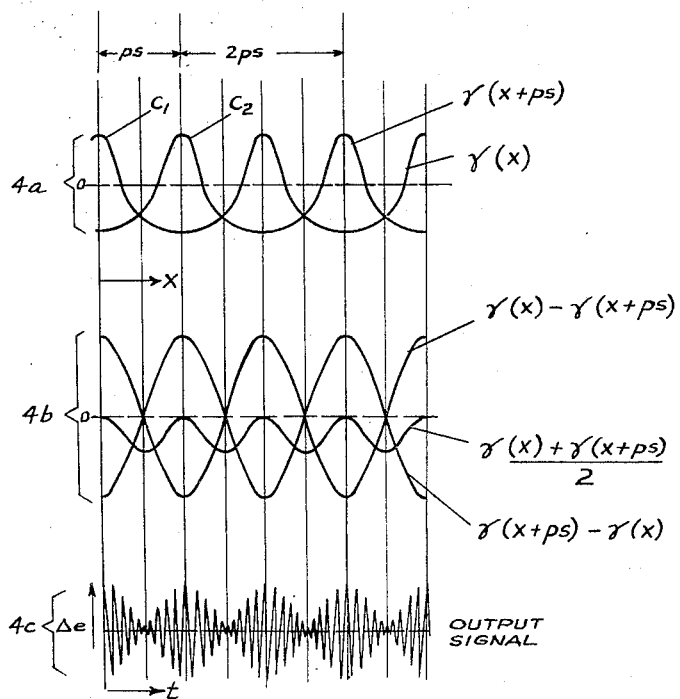
Fig. 4 is a system of graphs illustrating electrical results flowing from operation of the bridge components in the system illustrated in Fig. 1.

This is illustrated graphically in Fig. 4, where curves "4a" and "4b" show the capacitance fluctuation while the lower curve (4c) represents the output signal, and shows how this signal delivered to line 46 (Fig. 1) will rise periodically to a peak voltage amplitude; these peaks being twice as frequent as the peak points of either of the "4a" curves, considered alone. Also, the use of the two variable condensers produces symmetry in the curve "4c" representing the signal output to line 46 and hence a corresponding regularity in the pulses 48a transmitted by the action of pulse former 45. It will be observed upon reference to the intermediate curve of the "4b" group, that the quantity $$\frac{1}{2}[\gamma x + \gamma(x+ps)]$$

has a zero value at each of the peak points of the associated curves. It is for this reason not important in the development of the output signal curve as plotted at "4c."

Reference characters 25, 26, 27, 28, and 29 designate cooperating components of a computer system in which the count of electrical pulses in the counting unit 29 is applied to a unit 28 to establish coincidence with a prescribed pulse value stored in a register 27 by manual operation of a limit selector 25 or equivalent device operating to convert a decimal numerical value to binary digital form. If the maximum travel of lead screw 6 is not in excess of 4.095 inches, and if 1,000 pulses are generated by the capacitance plates $C_1$ and $C_2$ for each inch of travel, twelve digits of the binary system (capable of counting to a maximum decimal value of 4095) will suffice to control the total screw travel within a tolerance of .001 inch. (For greater travel distances one or more digits could be added.) To cause automatic stopping of the lead screw when it has traveled a prescribed distance of, say 4.047 inches, the operator will enter the decimal number 4047 on the limit selector 25 (which may be of the voltage-controlled pulse counting type illustrated in Fig. 2 and more fully described hereinafter, as well as in Hoeppner patent, No. 2,616,965) with the result that an electrical current will flow in ten of the twelve conductors leading to the register 27. The current carrying conductors will be those designated 31, 32, 33, 34, 35, 36, 39, 40, 41 and 42, leading to the corresponding binary positions in the register, these being the "positive pulse" positions involved in establishing the binary equivalent —1–1–1–1–1–1–0–0–1–1–1–1— of the decimal number 4047.

The register 27 is preferably of the bistable multivibrator type in which there is a pair of inter-connected triodes for each binary digit to be represented, with the individual tubes of each pair alternating between conductive and non-conductive conditions in response to the impressment thereon of binary digital values which likewise alternate between the "1" and "0" denominations, the "1" denomination being represented in a given position of the register by the flow of current to the control grid of the multivibrator pair associated with said position, and the "0" denomination being represented by the absence of current flow.

The coincidence detector 28 is preferably constituted by a series of twelve dual control grid tubes, each having one of its grids in circuit with a corresponding set of multivibrators of the register 27, so that each tube of the coincidence detector is alternately conductive (or conditioned for conductivity) and non-conductive, according to whether its associated multivibrator in register 27 is conductive or non-conductive, and this in turn depends upon whether the latter elements are registering "1" or "0" digital values at the moment under consideration.

The second control grids of the coincidence detector tubes connect electrically with associated operating units of the pulse counting mechanism 29. The latter may be of a known type comprising twelve sets of bistable multivibrators (one set for each digit of the assumed twelve digit binary code) similar to those of register 27, and connected to count every "nth" pulse 51a originating in oscillator 48 and pulse former 43, the "nth" pulses being those which clear through a gating tube 44 when the latter is triggered by a current pulse of proper potential delivered to said gate 44 by way of pulse former 45 and conductor 46 leading from tap 47 of the Wheatstone bridge 50 heretofore described.

The majority of the pulses 51 delivered to line 49 find their way to amplifier 68, rather than to gate 44, as the latter opens only once for every .001 inch of travel of the carriage 16 (with the assumed spacing of the ridges of the plates $C_1$, $C_2$ and 5c) for it is only once in every .001 inch of carriage travel that there occurs a gating pulse 48a to reverse the normal grid bias of gate 44. Bridge 50, as heretofore explained, operates to produce a pulse forming voltage peak in line 46 each time either of the capacitance units 56 and 57 reaches a maximum value by reason of coincidence between one of its ridge points and one of those of lower unit 5c. Such peaks, with the ridge spacing and vernier ratio assumed, will occur at every .001 inch increment of travel of the carriage 16. Thus, in the assumed operation calling for a total carriage travel of 4.047 inches there will be 4047 stages of advance, with successive peak voltage pulses delivered to gating tube 44 by way of line 46, in synchronism with the completion of the successive stages, or divisions, of the total path of travel. These peak voltage pulses will be of sufficient strength to overcome the opposite potential bias normally maintaining the tube 44 inactive. As a result, every "nth" pulse 51 traveling down line 49 will be diverted into the tube 44 and from said tube will pass to the stage counter 29, where it will produce a reversal of the conductivity status of one or more of the multivibrator tube sets in the counter series, the sets being reversed in predetermined progression corresponding to the well-known scheme of operation of binary counters, until finally there is accomplished a sufficient number of reversals to cancel out all of the "1" values entered on the register 27 and transferred therefrom to the grids of the coincidence detection tubes. This will occur when the 4047th pulse 51a (representing the 4047th travel stage of carriage 16) has entered the counter 29.

Thereupon all of the tubes 28 being now non-conductive, a potential rise will occur between lines 61 and 62 of such magnitude as to exceed the bias set up by voltage divider resistances 63 and 64. This will cause diode comparator 65 to become conductive, sending a pulse 66 along line 67 and thereby setting in motion the instrumentalities for stopping the carriage 16, with promptness and precision, before it will have time to traverse another .001 inch travel stage. These stopping instrumentalities will shortly be described.

In order to synchronize the commencement of pulse propagation with the commencement of the travel of the machine element 16, the supply of operating current to driving motor 8 is subject to control by a switch 71 responding to energization of a solenoid 72 whose winding is in series with the output of amplifier circuit 68, the latter being triggered by the first pulse 51 sent out over line 49 by oscillator 48, and being maintained in the conducting state throughout the period of activity of oscillator 48, and until stopping of said oscillator by the operation of stopping pulse 80 fed back to the multivibrator 81 over line 82, by way of delay multivibrator 69 and clearing circuit 70, the manner of operation of such an oscillation stopping circuit being well known in the art. Prior to such stopping of the oscillator, and resultant de-energization of motor 8 (by reason of the de-energization of solenoid 72 and the re-opening of switch 71 by spring 75) there will be an application of brake shoe 76 to brake drum 14, thus assuring prompt and precise cessation of lead screw rotation, the clutch parts 12 and 13 undergoing relative rotation, if need be, to permit such prompt stopping of the carriage 16 notwithstanding possible continued rotation of the motor 8, due to the time lag required for deceleration of the motor. Application of brake 76 is effected by solenoid 83 energized from lines 9, 10 when switch 84 closes. Switch 84 is closed by the energization of solenoid 85, to which current is supplied by way of the output side of amplifier 86, the latter being triggered by the signal pulse 66 sent over line 67 when the counter 29 has run the detector tubes 28 to the coincidence condition, as heretofore noted.

A holding connection 91 serves to maintain solenoid 85 energized following initial closure of the contact elements 84, so that the brake remains applied until the subsequent stopping of pulse transmission over line 49, at which time solenoid 93 is de-energized, and switch 94, is re-opened by the action of spring 95. This opening of switch 94 (which had been closed throughout the cycle of pulse transmission) causes cessation of the flow of current to solenoid 85 and this permits spring 87 to re-open the switch 84 and thereby permit release of the spring-released solenoid brake 76, by reason of the de-energization of solenoid 83. The cycle of operation is thus completed, the motor 8 having come to rest when the pulse propagation ceased, and the register 27 having been re-set to the zero reading by the action of clearing pulse 80 fed thereto (as well as to counter 29 and multivibrator 81) over lines 82 and 67.

Figure 2:
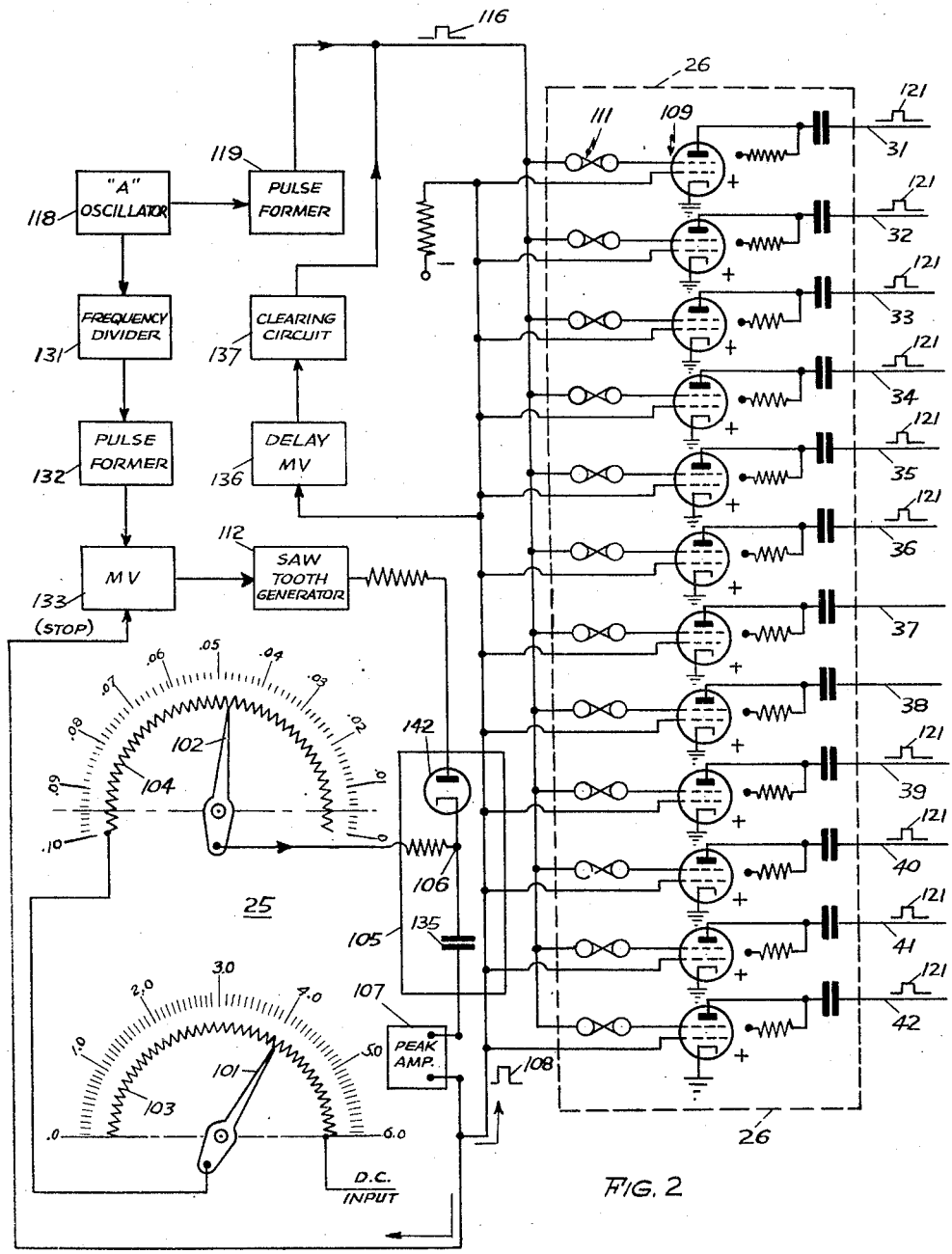
Figs. 2 and 3 show details of certain elements indicated on a smaller scale in Fig. 1.

The limit selector 25 may take any convenient form for entering in the register 27 (of Fig. 1), the binary digits corresponding to the decimal dimension entered upon selector 25 as representative of the extent of travel (linear or angular) to be imparted to the work piece (or tool holder) 7. As shown in Fig. 2, by way of example, the selector may include two or more manually operable voltage setting dials or pointers 101 and 102 cooperating with resistance units 103 and 104, respectively, to reduce a D.C. input voltage to a value—as, for example, 4.047 volts—corresponding to the travel dimension to be entered upon register 27. As illustrated, "coarse" register 103 would reduce the voltage to 4.100 volts, and "fine" resistor 104 would further reduce this voltage to 4.047 volts, the resistor 103 having approximately fifty tapping points selectively engageable by pointer 101, with a spacing of about four degrees between taps, and the resistor 104 having approximately 100 tapping points, spaced two degrees apart, and a scale graduated in dimensional intervals of .001", running from .001" to .100". Hence with the points 101 and 102 set at readings "4.1" and ".047," respectively, the input voltage at line 100 would be converted to 4.047 volts (actually to 4.047—$x$ volts, $x$ being the differential required for operation of diode 142, as hereinafter explained) at point 106 of a comparator device 107 corresponding to the comparator 136 of Hoeppner Patent No. 2,616,965, and functioning (in the manner more fully described in said patent) to send a "sampling" pulse 108 to the lower control grids of all the tubes of coincidence bank 109, certain of said tubes being at that instant also in receipt of counting pulses from the sequentially flopping multivibrator binary counters 111, functionally corresponding to the counters 48–54 of said Hoeppner patent. The instant of sampling pulse transmission, as explained in said patent, will be that instant when the voltage generated in the saw-tooth generator unit 112 has risen to the value (4.047 volts, in the assumed example) sufficient in magnitude, in relation to the slightly lower voltage at point 106 of the comparator, to cause diode 142 to become conductive. When this sampling pulse 108 reaches the coincidence tubes 109, those tubes which are at that moment receiving a counting pulse 116 at their upper control grids—which counting pulses combine in binary code to represent the decimal number 4047, indicating that oscillator 118 has emitted 4047 pulses during its current operating cycle—will cause corresponding counting pulses 121 to pass along the lines leading to register 27, to enter therein the binary number —1–1–1–1–1–1–0–0–1–1–1–1— corresponding to the decimal dimension 4.047 inches. The register 27 will then proceed to perform its control function (in cooperation with the travel stage counter 29 and the coincidence tubes 28), as heretofore described.

A frequency divider 131, having a frequency of a much smaller order than the oscillator 118, feeds its output into a pulse former 132 and a bistable multivibrator gate 133, to produce a square wave signal operative upon the saw-tooth generator 112 to produce a rising voltage in the line leading to the comparator 105, heretofore described. A capacitance unit 135 and a peak amplifier 107 are interposed in series in the comparator output circuit, as in the Hoeppner Patent No. 2,616,965.

In addition to providing operating pulses for the frequency divider 131 and saw-tooth generator 112, the oscillator 118 operates through pulse former 119 to send pulses into the counter tubes 111 heretofore referred to. Delay multivibrator 136 and clearing circuit 137 operate to re-set the counters 111 after the counters have run to coincidence with the pulse count set up on dials 103, 104 by the combined action of pointers 101 and 102, respectively. This counter clearing operation may take the same form as in the Hoeppner patent above identified.

For the sake of simplicity a pure capacitance bridge has been assumed, but a resistance-capacitance bridge would be equally applicable, or an inductance-capacitance or even a resistance-inductance-capacitance bridge in which capacitances only would vary with the displacement of the table. The result then would be to produce a sensible phase shift which could constitute a means of measuring fractionally between two neighboring coincidence points, in terms of phase displacement.

While the invention embodiment above described is fully automatic, in the sense that starting and stopping of motor 8 occur in automatic response to the setting of selector 25, and the keying of oscillator 48, it is, of course, contemplated that, in other embodiments, the starting and/or stopping of the motor may occur by direct manual intervention. Where, for example, the pulse 66 is utilized to operate (directly or indirectly) an audible or visible signal device, or annunciator, signifying that the assigned travel dimension has been attained, the machine attendant may thereupon stop the feed by direct manual intervention, in response to observance of such signal or announcement whether aural or visual. Again, the electric motor 8 may be replaced with a fluid motor or any equivalent hydraulic or pressure fluid prime mover, and the solenoid type of controls illustrated may be replaced with electronic or other equivalent controls. Likewise, other motion stopping means may be substituted for the brake shoe 76, and other relative motion permitting drives may take the place of slipping clutch plates 12, 13, within the scope of the invention as broadly considered. Indeed, the invention is not limited to any of the particular details of method or structure herein described or illustrated. Many equivalent details will suggest themselves to those skilled in the art, and all such as are within the scope of the invention, in the broadest interpretation of the appended claims, are to be considered as embraced herein. By the same token, the invention embraces its component elements, when used independently of other components, and even when interacting therewith in a manner differing from the interaction specified herein, provided such modifications are inherent in the inventive concepts herein developed, and are embodied in structure embraced in the appended claims.

What is claimed is:

1. In a machine motion control system, a motor-driven machine element movable along a course composed of a series of measured stages, a supporting stationary element, complementary electrical means including a pair of interrelated capacitive plates carried by said two elements one of said capacitor plates having a predetermined number of edges moving in relation to the other fixed capacitor plate having one additional edge than said moving capacitor plate to provide a predetermined number of vernier capacitive peaks, means including a pulse transmitting circuit for controlling the starting of said motor-driven machine element, and electronically controlled pulse selection means receiving pulses from said pulse transmitting circuit, and also responsive to the relative position of said capacitive plates to count the capacitive peaks successively traversed by said movable machine element.

2. In a machine motion control system, a traveling machine element, driving means for said element, said driving means including a motor and transmission means rotatable by said motor, means including an electronic pulse generating and transmitting circuit for controlling the starting of rotation of said motor and transmission means, and electronically controlled pulse gating means actuated in part by said pulse transmitting circuit, and in part by said driving means for controlling the stopping of the rotation of said motor and transmission means when said machine element has traveled a predetermined distance, said last-named means also operating to cause de-energization of said motor following stopping of said transmission means.

3. In a machine motion control system, a traveling machine element, driving means for said element, said driving means including a prime mover and transmission means rotatable by said prime mover, means including an electronic pulse generating and transmitting circuit for controlling the degree of rotation of said transmission means in accordance with an electrical pulse count of predetermined magnitude, a capacitive assembly fed by said pulse generating circuit comprising a capacitor plate having a predetermined number of edges moving in relation to a fixed capacitor plate having one additional edge than said moving capacitor plate to provide a predetermined number of vernier capacitive peaks, means for counting said peaks, and means for de-energizing said prime mover following completion of said electrical peak pulse count.

4. In a machine motion control system, a traveling machine element, prime-mover driving means for said machine element a capacitance unit including a pair of capacitance plates whose relative physical spacing varies cyclically during travel of said machine element, and means responsive to the completion of a predetermined number of capacitance cycles for interrupting the flow of operating energy to said prime-mover driving means.

5. In a machine motion control system, a traveling machine element, prime-mover driving means for said machine element, means including an oscillator and a pulse former for generating and transmitting electrical pulses to control the energization of said prime-mover driving means a capacitance unit including a pair of capacitance plates whose relative physical spacing varies cyclically during travel of said machine element, means having electrical connection with said pulse transmitting means for counting the number of capacitance cycles occurring between starting and stopping of said element, and means for stopping said element when said counting means runs the count to a pre-assigned total.

6. In a machine motion control system, a traveling machine element, prime-mover driving means for said machine element, means including an oscillator and a pulse former for generating and transmitting electrical pulses to control the energization of said prime-mover driving means a capacitance unit including a pair of capacitance plates whose extremities alternately approach and separate to produce cyclic capacitance variation at a frequency proportional to the rate of motion of said traveling machine element, and means for registering the cyclic count.

7. In a machine motion control system, a traveling machine element, prime-mover driving means for said machine element, means including an oscillator and a pulse former for generating and transmitting electrical pulses to control the energization of said prime-mover driving means a capacitance unit including a pair of capacitance plates whose adjacent edges alternately approach and separate to produce cyclic capacitance variation at a frequency proportional to the rate of motion of said traveling machine element, means for registering the cyclic count, and means operated by said registering means for stopping said machine element after it has traversed a path of predetermined extent.

8. In a machine motion control system, a traveling machine element, prime-mover driving means for said machine element, means including an oscillator and a pulse former for generating and transmitting electrical pulses to control the energization of said prime-mover driving means a voltage varying unit including a pair of capacitance plates operating as voltage controlling elements having extremities which alternately approach and separate to produce cyclic capacitance variations during travel of said machine element, said extremities being of a number adapted to establish a vernier relationship between said pair of capacitive plates and means for counting the number of capacitance varying cycles occurring between starting and stopping of said element.

9. In a machine motion control system, a traveling machine element, prime-mover driving means for said machine element, means including an oscillator and a pulse former for generating and transmitting electrical pulses to control the energization of said prime-mover driving means a voltage varying unit including a pair of capacitance plates operating as control elements having extremities which alternately advance and retreat to produce cyclic voltage variations at a frequency proportional to the rate of motion of said traveling machine, said extremities of one capacitive plate being of a lesser number than the extremities of said other capacitive plate to establish a vernier relationship therebetween, and means for registering the cyclic count.

10. In a machine motion control system, a traveling machine element, driving means for said element, an electronic pulse generating system, a pulse gating circuit actuated in part by said pulse generating system and in part by said driving means for controlling the stopping of said machine element, capacitance means operable to produce pulses at a frequency proportional to the distance traversed by said traveling machine element, means for counting said pulses, means for registering the pulse count, and means actuated by said pulse gating circuit to stop said machine when said pulse count reaches a predetermined total count.

11. In a machine motion control system, a traveling machine element, an electronic pulse generating system including a capacitor plate moving synchronously with said machine element and a co-operating capacitor plate restrained against motion, said pulse generating system operable to produce pulses at a frequency proportional to the distance traveled by said traveling machine element, one of said capacitor plates having a lesser number of extremities than said other capacitor plates to establish a vernier relationship therebetween, means for counting and storing said pulses, and means responsive to operation of said pulse storing means to compare said stored pulses with a predetermined number of pulses to stop said machine element after it has traversed a path of predetermined extent.

12. A system for limiting the extent of travel of a machine element being driven in a continuous manner by a prime mover comprising means for driving said element, means for producing electrical energy flow in the form of binary electrical pulses corresponding to time intervals measured by the progressive advance of said machine element, said last recited means including a capacitance unit including a pair of capacitance plates whose relative physical position varies cyclically during said advance to produce capacitance peaks, means for cyclically advancing the physical position of said plates during the advance of said machine element, means for counting the number of such peaks, and means for interrupting the flow of activating energy to the prime mover when the binary count reaches a pre-assigned total value.

References Cited in the file of this patent

UNITED STATES PATENTS

| | | |
|---|---|---|
| 1,375,692 | Goodrum | Apr. 26, 1921 |
| 1,455,795 | Logan | May 22, 1923 |
| 1,979,020 | Whitney | Oct. 30, 1934 |
| 2,295,118 | Le Clair | Sept. 8, 1942 |
| 2,311,142 | Turrettini | Feb. 16, 1943 |
| 2,398,046 | Schaefer | Apr. 9, 1946 |
| 2,546,980 | Collins | Apr. 3, 1951 |
| 2,557,219 | Flint et al. | June 19, 1951 |
| 2,575,792 | Bullard et al. | Nov. 20, 1951 |
| 2,585,955 | May | Feb. 19, 1952 |
| 2,611,813 | Sharpless et al. | Sept. 23, 1952 |
| 2,615,127 | Edwards | Oct. 21, 1952 |
| 2,620,982 | James | Dec. 9, 1952 |
| 2,672,067 | Hansell | Mar. 16, 1954 |
| 2,674,728 | Potter | Apr. 6, 1954 |
| 2,674,729 | Carter | Apr. 6, 1954 |
| 2,685,082 | Beman et al. | July 27, 1954 |
| 2,694,804 | Wagner | Nov. 16, 1954 |
| 2,710,934 | Senn | June 14, 1955 |

OTHER REFERENCES

Electronics (Predetermined Counter for Process Control), pages 88 to 93, inclusive, February 1948.